US011953177B1

(12) United States Patent
Rashidi Doust

(10) Patent No.: US 11,953,177 B1
(45) Date of Patent: Apr. 9, 2024

(54) COMPACT FIRE RATED RECESSED LIGHT FIXTURE

(71) Applicant: ELITE LIGHTING, Commerce, CA (US)

(72) Inventor: Hamid Rashidi Doust, Beverly Hills, CA (US)

( * ) Notice: Subject to any disclaimer, the term of this patent is extended or adjusted under 35 U.S.C. 154(b) by 0 days.

(21) Appl. No.: 18/092,687

(22) Filed: Jan. 3, 2023

(51) Int. Cl.

| | |
|---|---|
| ***F21V 15/00*** | (2015.01) |
| ***F21S 8/02*** | (2006.01) |
| ***F21V 25/12*** | (2006.01) |
| *F21Y 115/10* | (2016.01) |

(52) U.S. Cl.
CPC .............. *F21S 8/026* (2013.01); *F21V 25/12* (2013.01); *F21Y 2115/10* (2016.08)

(58) Field of Classification Search
CPC ........ F21S 8/026; F21V 25/12; F21Y 2115/10
See application file for complete search history.

(56) References Cited

U.S. PATENT DOCUMENTS

2003/0223240 A1* 12/2003 Houle .................... F21V 21/04 362/396
2008/0170404 A1* 7/2008 Steer ........................ F21S 8/02 362/365
2015/0345758 A1* 12/2015 Highbridge ............ F21V 15/01 362/369

FOREIGN PATENT DOCUMENTS

GB 2430729 A * 4/2007 ................ F21S 8/02

* cited by examiner

*Primary Examiner* — Elmito Breval
(74) *Attorney, Agent, or Firm* — Payam Moradian

(57) ABSTRACT

Provided is a fire-resistance housing for a light fixture comprising: an outer can made from a metal; an inner can made from a metal; and a non-metal, in-organic, non-combustible material in between the outer can and the inner can; wherein a source of light is placed inside of the inner can to provide illumination.

17 Claims, 11 Drawing Sheets

COMPACT FIRE RATED RECESSED LIGHT FIXTURE

BACKGROUND SECTION OF THE INVENTION

Recessed and surface mounted light fixtures are placed inside or in proximity to the ceiling. There is a need to contain a fire that occurs inside of a light fixture. Otherwise a fire from a light fixture can spread to a floor above the ceiling where the light fixture is placed.

To address this issue, generally an enclosure is built around a recessed light. These enclosures include a fire box that surrounds the recessed light. The problem with fire boxes is that multiple subcontractors may be needed to install a recessed light. The fire boxes may not be designed for standard joist construction, requiring larger joist that may be more expensive to construct. Due to the size of the box, recessed lights cannot be installed in close proximity to each other or close to the wall. The fire box can only be installed along a long axis. Furthermore, requiring installing the fie box first and then installing the recessed light inside the box can cause delays in construction, and increases the overall costs of labor and material. The use of a fire box may use additional materials such as drywall, caulk, gaskets, hats and joint tape. Lastly, because a box must be made from drywall around each recessed lighting, additional clearance is needed, thereby limiting location.

There is a need in the art for a recessed light fixture that is fire resistant without the need of a fire box.

SUMMARY SECTION OF THE INVENTION

Provided is a fire-resistance housing for a light fixture comprising: an outer can made from a metal; an inner can made from a metal; and a non-metal, in-organic, non-combustible material in between the outer can and the inner can, wherein a source of light is placed inside of the inner can to provide illumination. The material can be a fiber. The fiber can be ceramic fiber. The clip can be made from steel. The inner can and the outer can are made from steel. The inner can further comprises an outwardly flange portion. The inner can has an opening on a top portion for injection of the material in between the inner can and the outer can. The material is placed on top of the flange portion of the inner can and above an upper portion of the inner can. The outer can further comprises an outwardly flange portion. A cable goes through the inner can, the material, and the outer can to connect the source of light to a source of power. The inner can and the outer can are connected to each other by a fastener. A housing is attached to the inside of the inner can for placement of the source of light. A board with the source of light is placed inside of the housing, and attached to the inner can with a fastener. A trim of the housing has a flange portion that is positioned below a flange portion of the outer can. A clip is attached to the outer can for attaching the can to a ceiling. The clips are made from steel.

Provided is a fire-resistance housing for a light fixture comprising: an outer can made from steel, the outer can have a top portion, a circular side portion, and a circular flange portion; an inner can made from steel, the outer can have a top portion, a circular side portion, and a circular flange portion, with a tip of the inner can touching inside of the sidewall of the outer can; a non-metal, in-organic, non-combustible material in between the outer can and the inner can, the material placed above the flange portion and the top portion of the inner can; a wire exiting the outer can for carrying power to a source of light; and a clip attached to the outer can for attaching the can to a ceiling; and a housing with a source of light inside attached to an inside of the inner can. The material can be a fiber. The fiber can be ceramic fiber. The housing can have a flange portion that is positioned below and touches the flange portion of the outer can.

DETAILED DESCRIPTION OF THE SECTION

Figure 1:
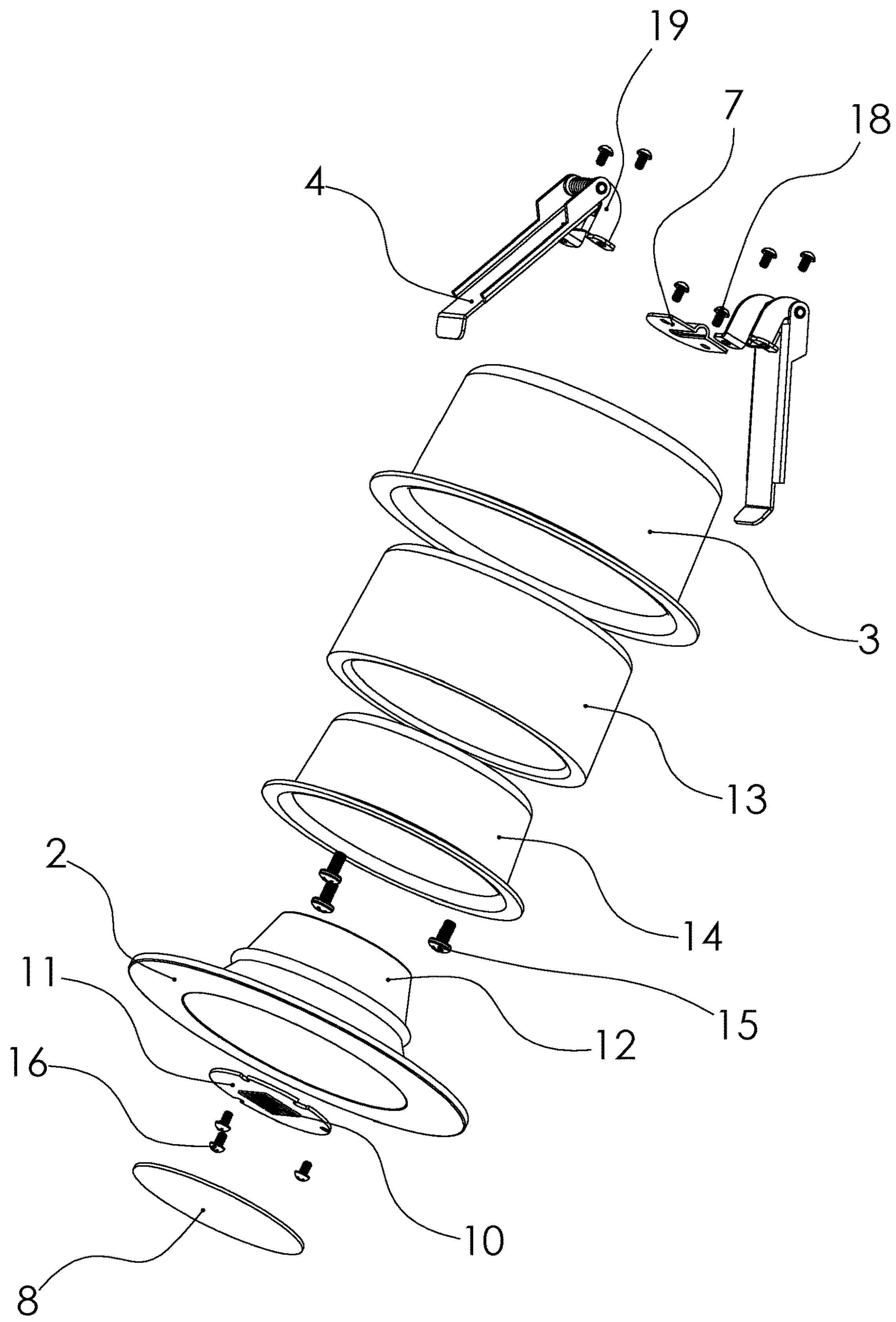
FIG. 1 illustrates an exploded view of the light fixture, illustrating in this case a baffled recessed light fixture.

Provided is a fire-resistant light fixture. FIG. 1 illustrates an exploded view of the fire-resistant light fixture. The light fixture has an inner can 14 and an outer can 3 to contain a fire that starts inside of the inner can 14. The inner can 14 and the outer can 3 are made from a fire-resistant metal 13, such as steel. The inner can 14 and the outer can 3 are configured to be positioned in a concentric manner. The inner can 14 has a smaller radius, and is positioned inside of the outer can 3. The inner can 14 and the outer can 3 may be made from a uniform cast metal.

The height (without the flange portion) of the inner can 14 may be about 30 mm to about 40 mm, such as about 36 mm. The height of the outer can 3 can be about 50 mm to about 60 mm, such as about 53 mm.

The inner can 14 and the outer can 3 may both have a cylindrical portion, a top (which entirely covers and seals the cans on the top), and an open bottom with an outwardly flange portion. The inner can 14 and the outer can 3 are configured to form a space in between them for placement of a fire-retardant material 13. The inner can 14 and the outer can 3 are attached to each other with fastener 15 going inside a fastener receiver that is permanently attached to the outer can 14.

The fire-retardant material 13 is placed above and around and outside of the sides of the inner can 14, and below and around the inner sides of the outer can 3.

The fire-retardant material 13 can be an inorganic, non-combustible, and non-metal material. The term non-combustible is used according to its ordinary meaning and means that the material will not ignite or burn when exposed to fire. The fire-retardant material 13 can be made from inorganic fibers such as: glass, carbon, metal, and ceramic. The fire-retardant material 13 can be made from ceramic fiber and fiberglass. Ceramic fiber is a synthetic fiber produced composed of high purity aluminosilicate materials. The fire-retardant material 13 can be made into shape of a can, in shape of a cylinder, with a closed top and an open bottom. The fire-retardant material 13 can be made from a single piece of material or multiple pieces. Rolls of fiber material can be used to make a can shaped fire resistant layer that goes in between the outer can 3 and the inner can 14.

The fire-retardant material 13 can also be injected into the space between the inner can 14 and the outer can 3. A small opening (such as the opening showed by the fastener in FIG. 2) on the top of the inner can 14 can allow for injecting the material 13 in between the inner can 14 and the outer can 3.

One or more clips 4, typically two clips 4, are positioned on the opposite sides of the outer can 3. The clips 4 are made from a fire-resistant metal 13, such as steel, that does not melt during a typical fire. The clips 4 further have springs made from a fire-resistant metal 13, such as steel. The clips 4 get positioned above a ceiling 20 and keep the "can-fiber-can" assembly in the ceiling 20.

A source of light (LED) 10 is placed inside of the inner can 14 of the can-fiber-can assembly. The housing 12 with the LED 10 source of light can be attached to the inner can 14 through the fastener 16.

A circular housing 12 having a source of light is placed inside of the inner can 14. The top of the housing 12 can be attached with a fastener 16 to the top of the inner can 14.

The housing 12 can have an LED board with a plurality of LED 10 sources placed under the board. The board is attached to the inside top of the housing with one or more fasteners. A lens is placed in front of the LED 10 sources.

Figure 2:
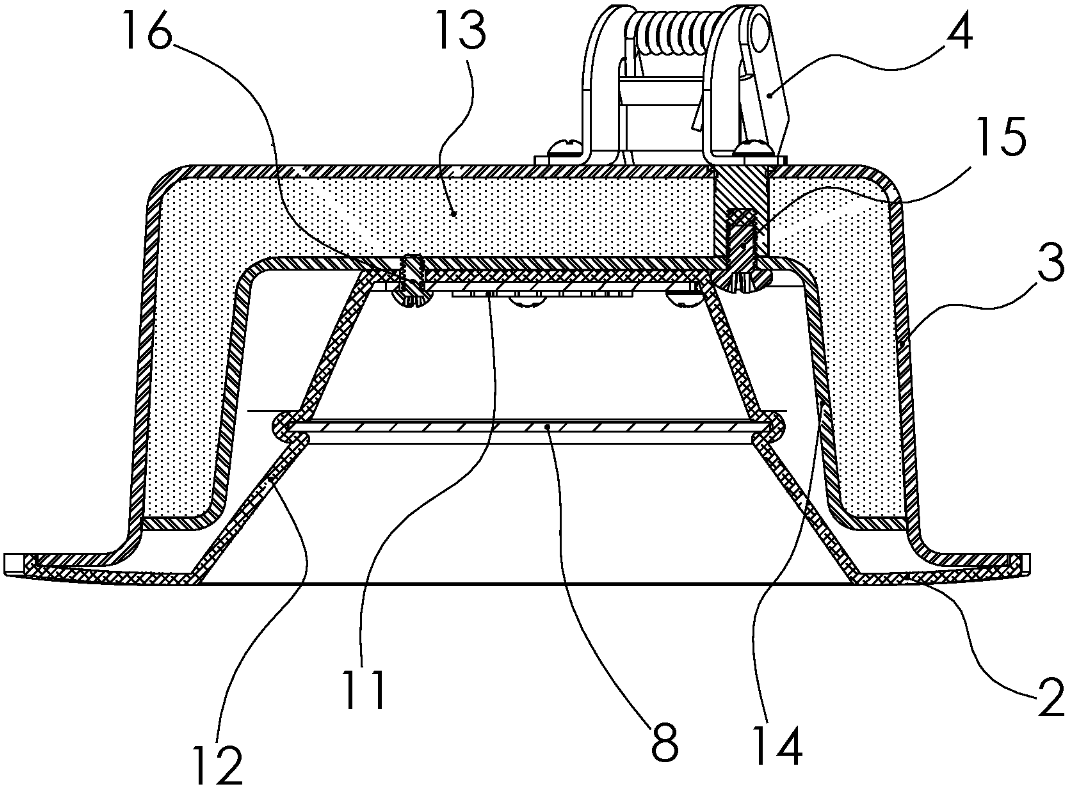
FIG. 2 illustrates a cut-off side view of the recessed light fixture.

FIG. 2 illustrates a cut-off side view of the recessed light fixture 12. The can-fiber-can assembly with the LED 10 housing inside of the inner can 14 is illustrated. The clips are attached to the top of the outer can 3, and come towards the sides of the outer can 3. The fire-retardant layer is on top of the flange portion of the inner can 14, and in between the inner can 14 and the outer can 3. The inner can 14 and the outer can 3 only make contact at the tip of the flange of the inner can 14.

A circular housing 12 with LED light sources 10 is attached with fastener 16 to the bottom of the inner can 14. The downwardly placed housing 12 has a trim 2 that is positioned below the flange portion of the outer can 3, and contacts the flange portion of the outer can 3.

As illustrated in FIG. 2, the lens 8 is placed in between the LED board 11 and bottom opening of outer can 3. Figure two illustrates a baffle recessed light.

Figure 3:
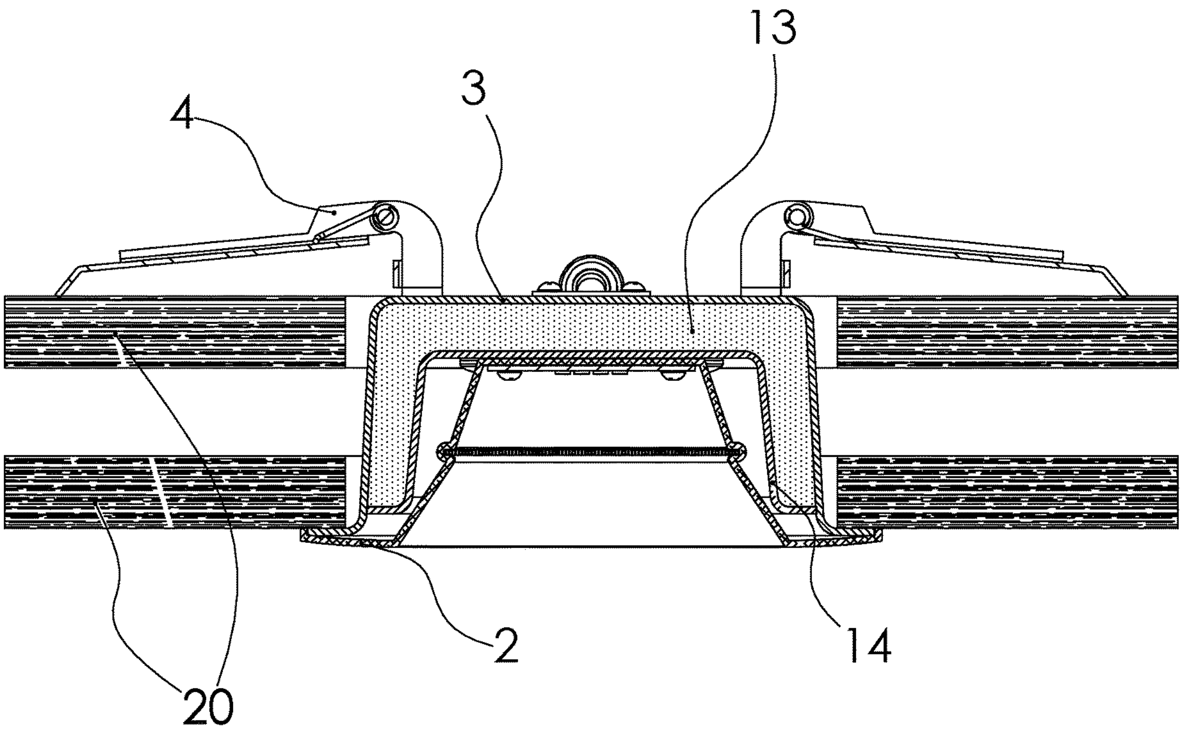
FIG. 3 illustrates the light fixture installed in a ceiling.

FIG. 3 illustrates the light fixture installed in a ceiling 20. The ceiling 20 can be made from fire rated materials 13, such as fire rated gypsum board. Clips 4 are placed on top of the ceiling 20 and hold the light fixture in place. The top of the flange of the outer can 3 touches the bottom of the ceiling 20. The end of the flange of the trim 2 may also touch the bottom of the ceiling 20. The flange of the outer can 3 closes any gap between the light fixture and the ceiling 20, and extend to below the ceiling 20.

Figure 4:
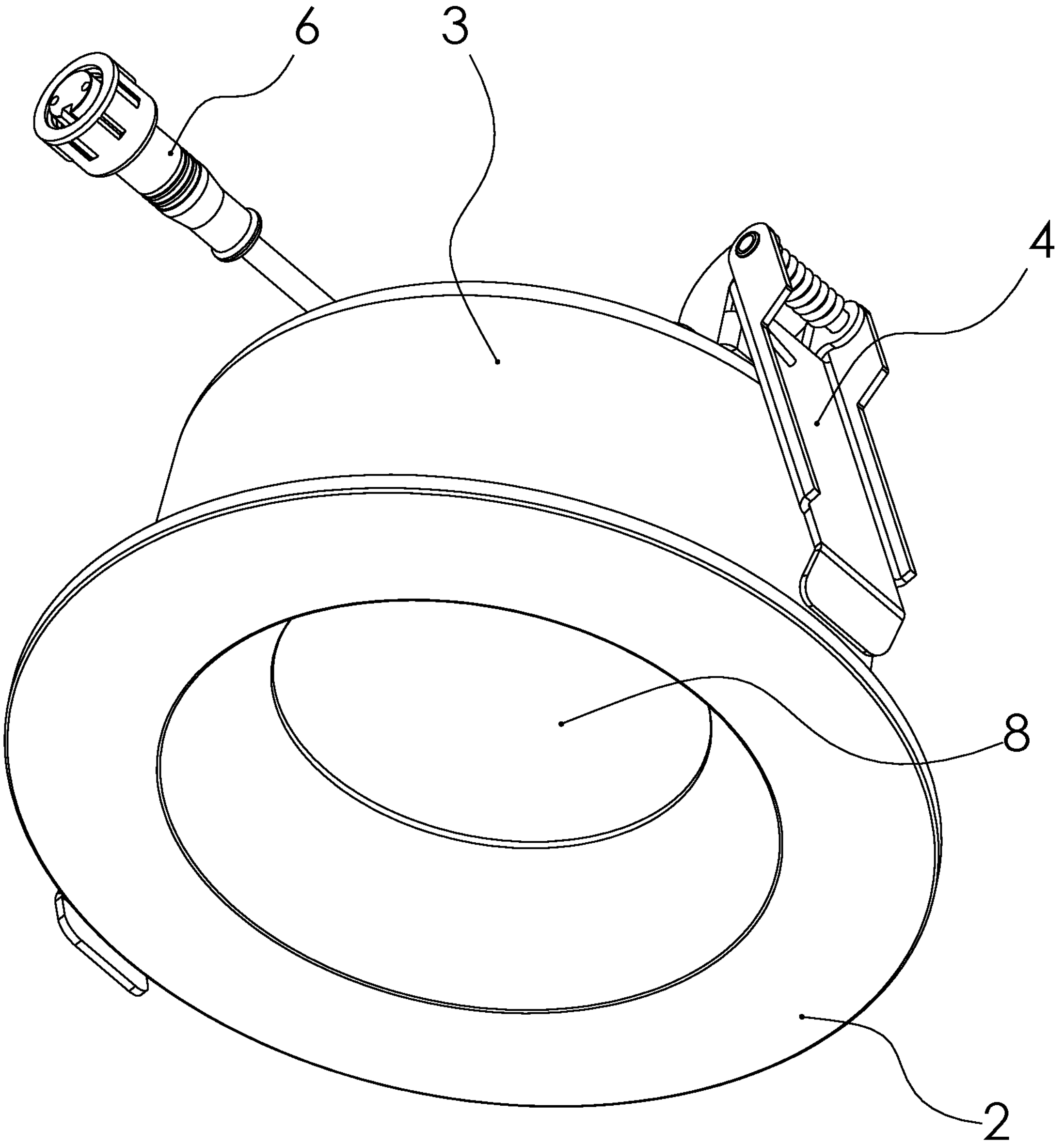
FIG. 4 illustrates a bottom perspective view of the light fixture.

FIG. 4 illustrates a bottom perspective view of the light fixture 12. Lens 8 is positioned further upward than the trim 2. Also visible in this view is the exterior can 3, clip 4, spring 5, and cable 6.

Figure 5:
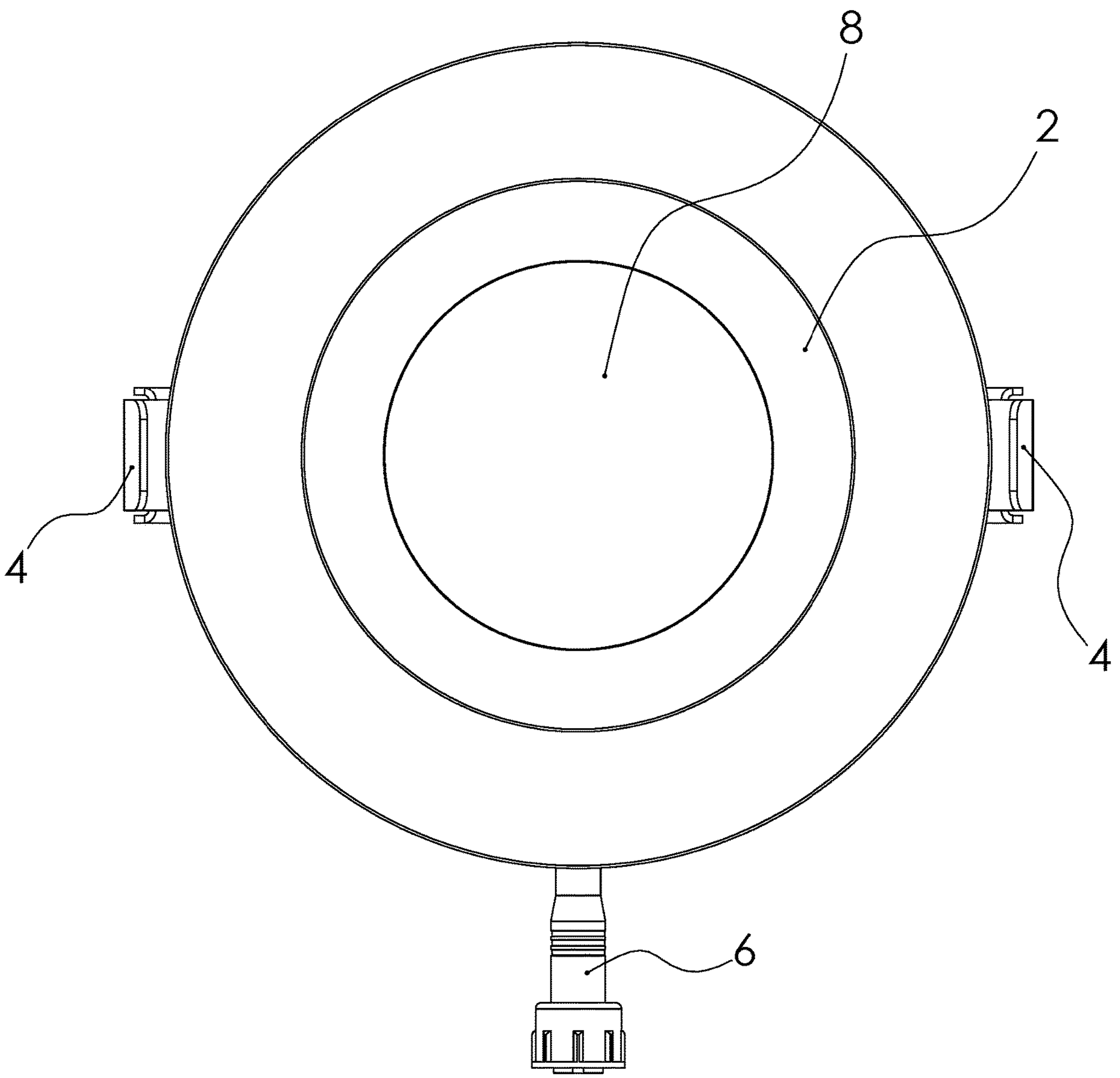
FIG. 5 illustrated a bottom view of the light fixture.

FIG. 5 illustrated a bottom view of the light fixture 12. Visible in this view are lens 1, trim 2, clip 4, and cable 6.

Figure 6:
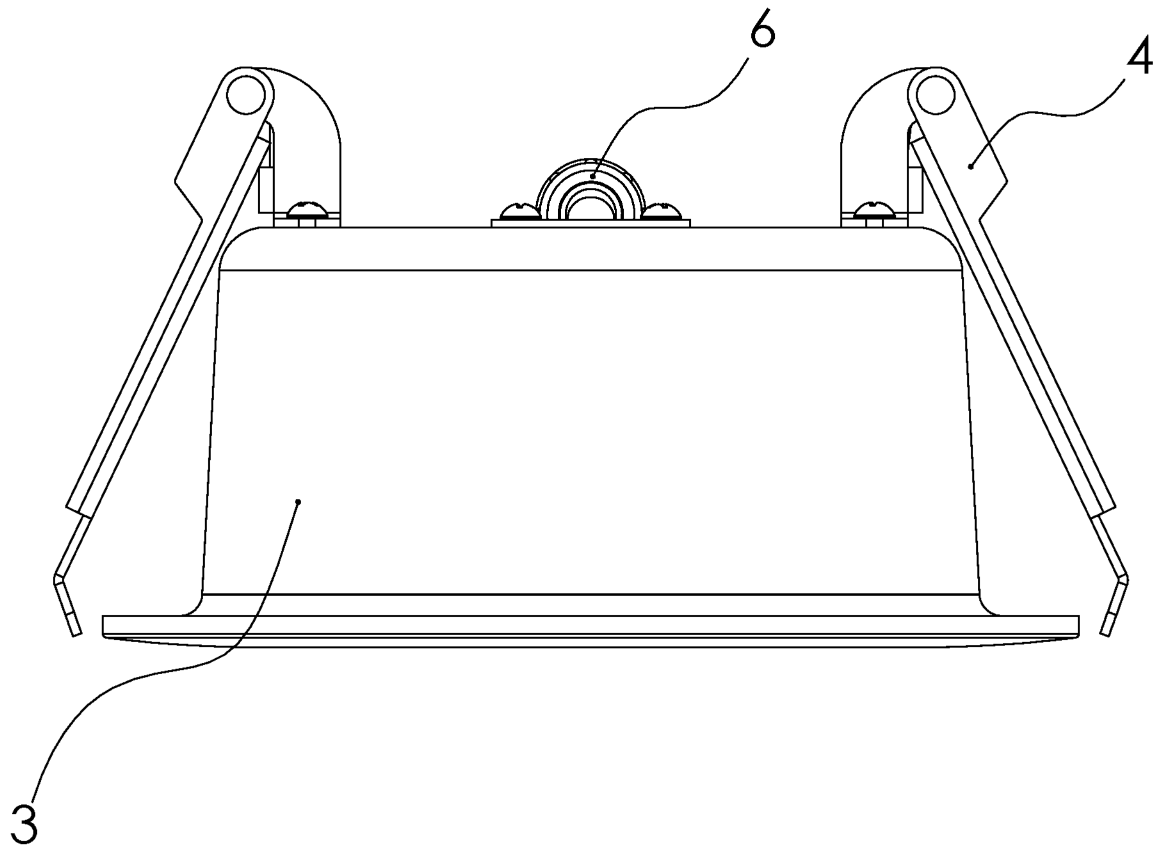
FIG. 6 illustrate side view of the light fixture.
Figure 7:
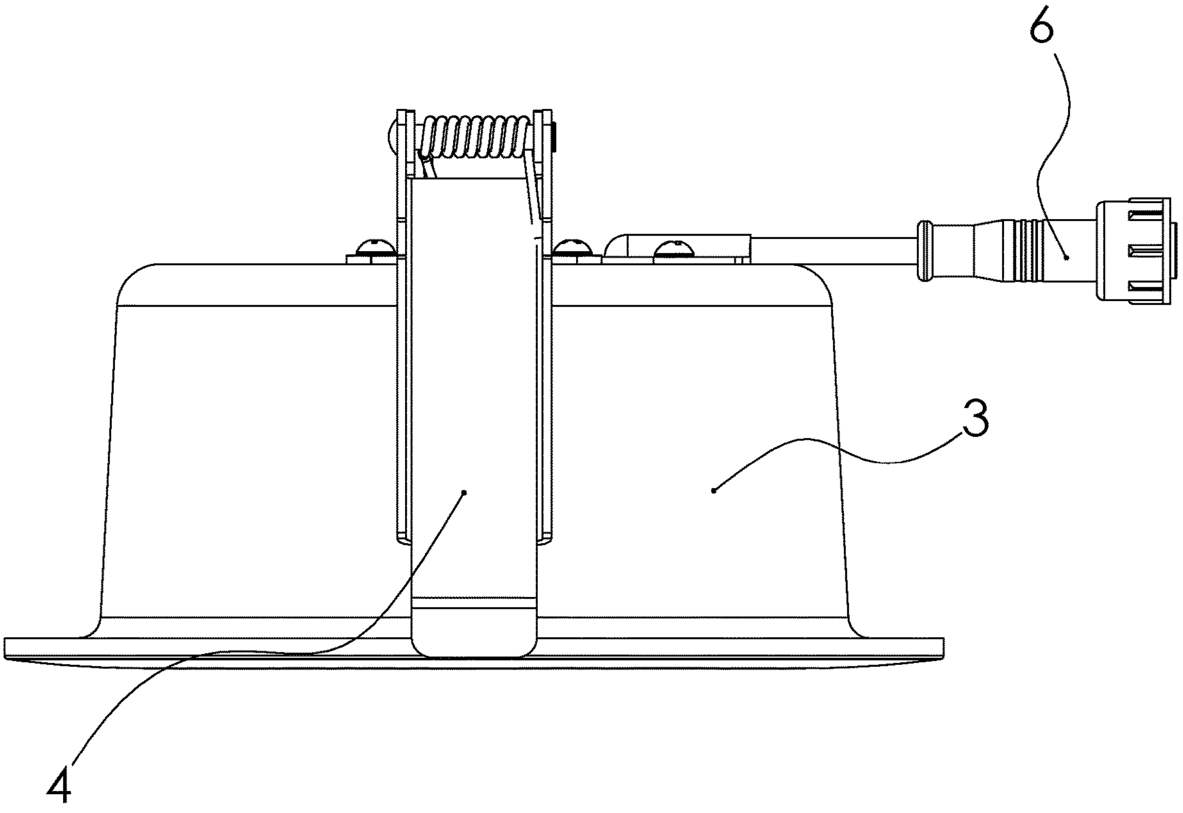
FIG. 7 illustrate side view of the light fixture.
Figure 8:
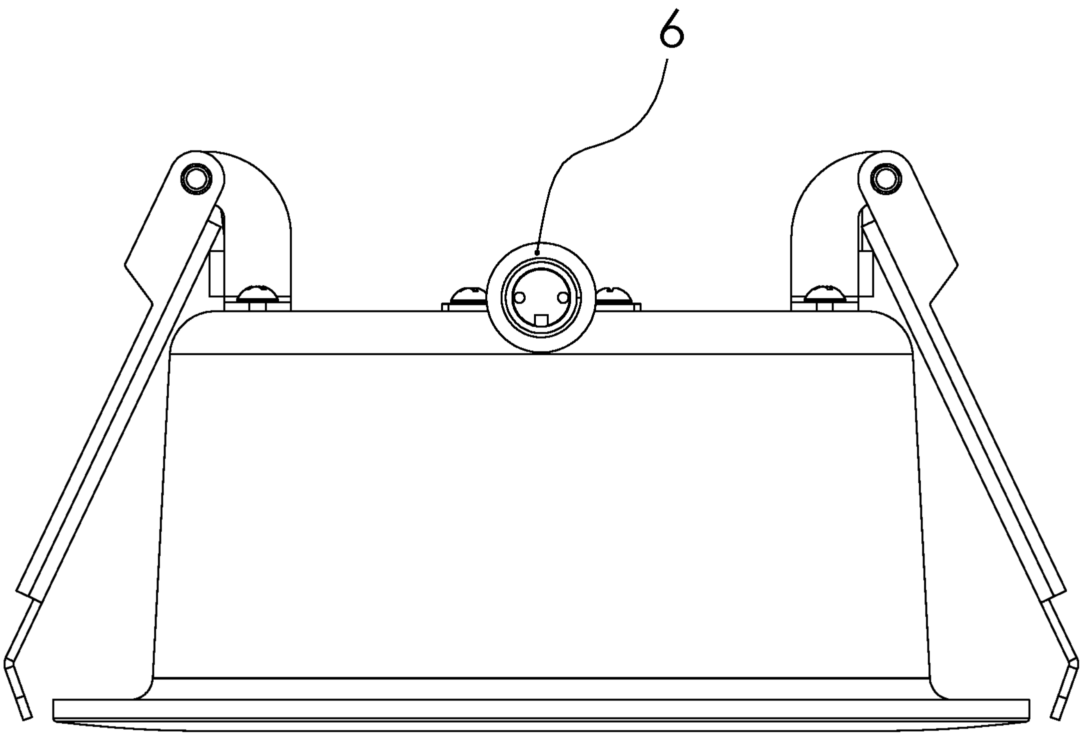
FIG. 8 illustrate side view of the light fixture.

FIGS. 6, 7 and 8 illustrate side views of the light fixture. Illustrated in these drawings are cable 6, outer can 3, and clip 4. The end of cable 6 can have a port for attaching to another cable 22 for carrying power to the fixture.

Figure 9:
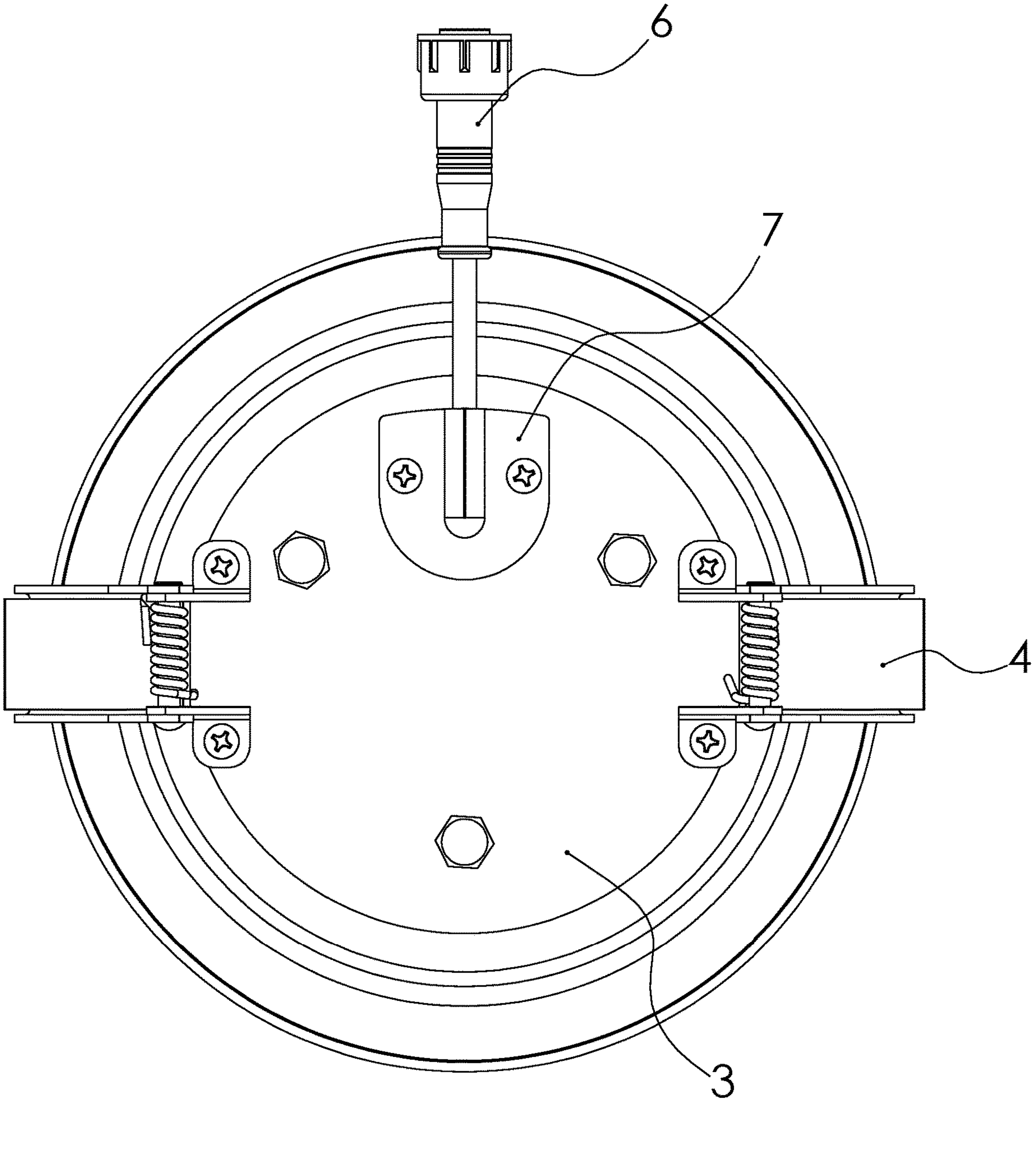
FIG. 9 illustrates a top view of the light fixture.
Figure 10:
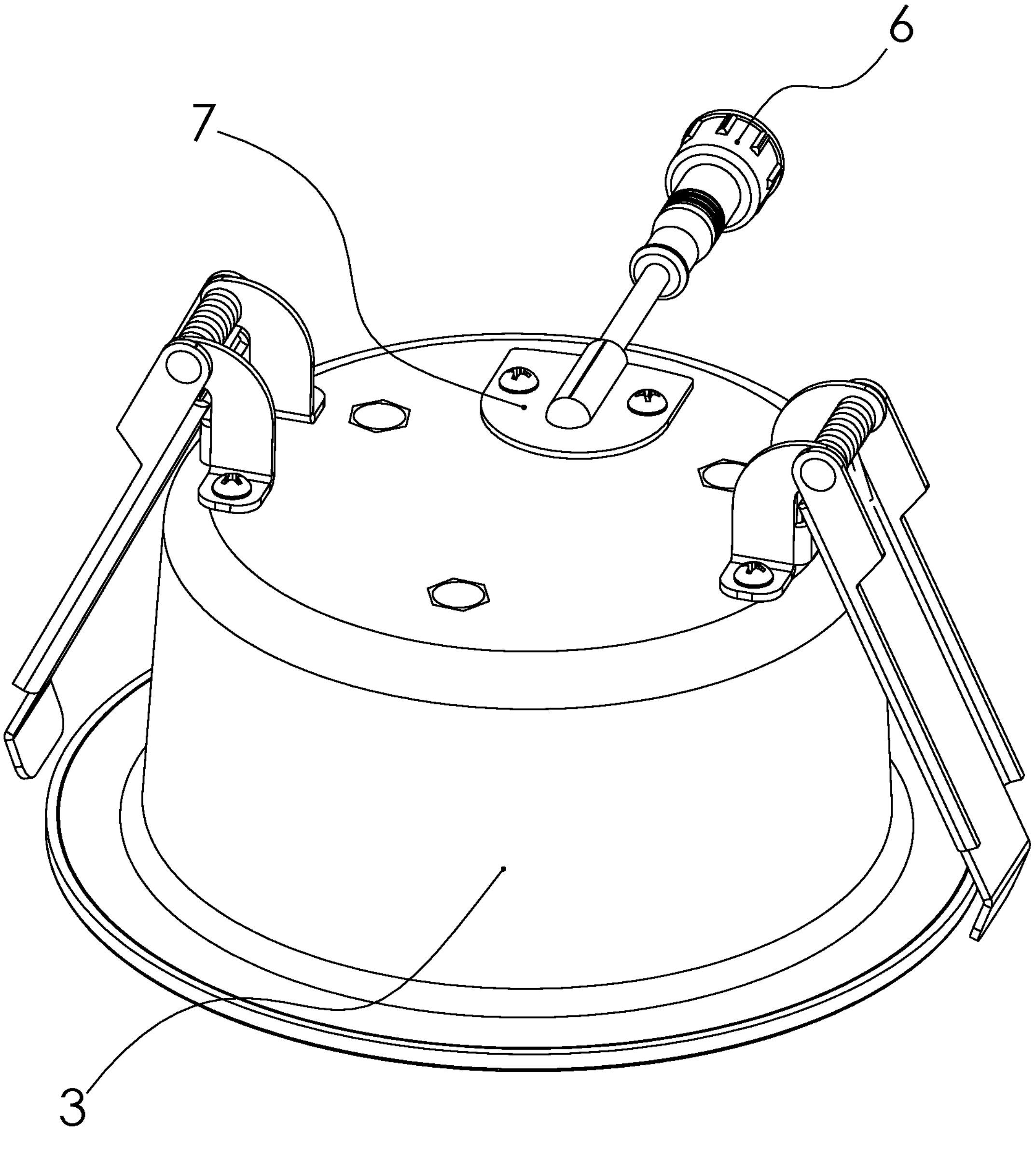
FIG. 10 illustrates a top perspective view of the light fixture.

FIGS. 9 and 10 illustrate a top perspective view and a top view of the light fixture 12. A wire cap 7 covers the opening in which cable 6 exits the top of the outer can 3.

Figure 11:
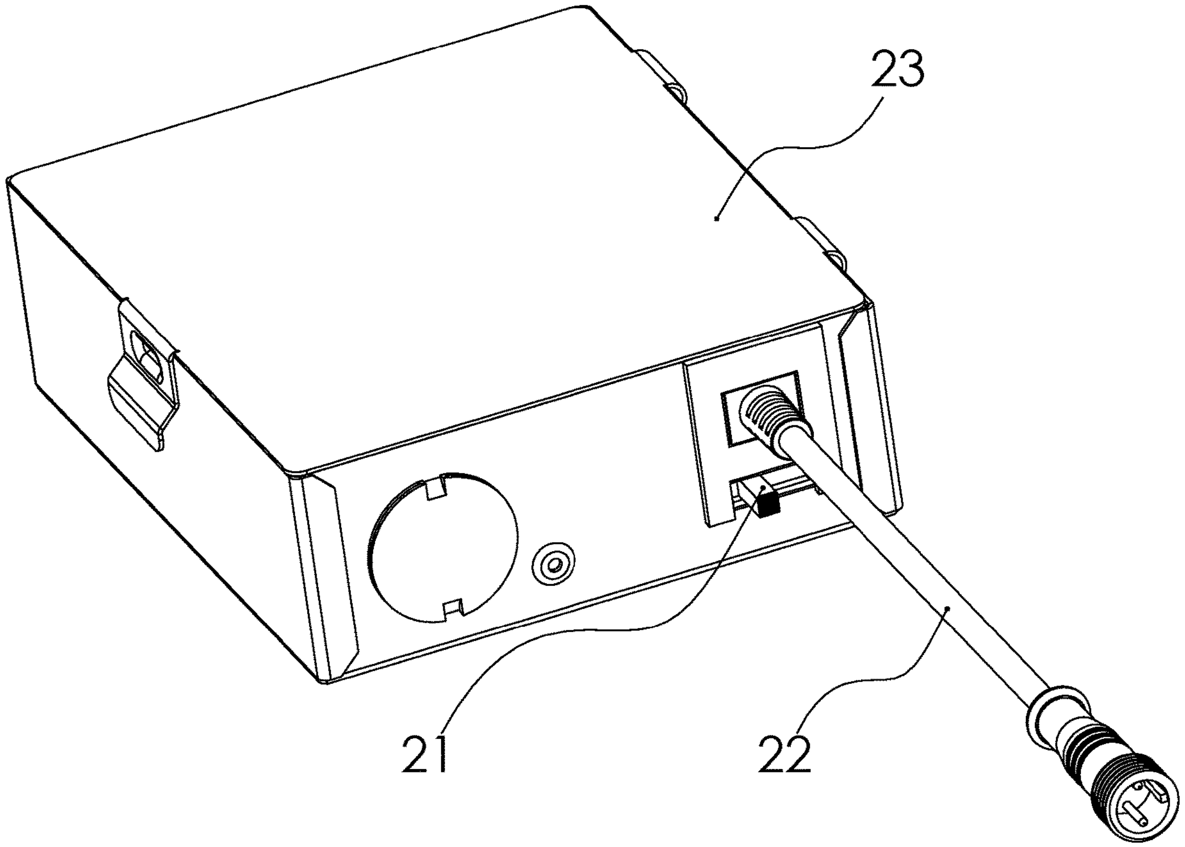
FIG. 11 illustrates a driver box.

FIG. 11 illustrates a driver 23, out of which cable 22 comes out. Cable 6 plugs into cable 22. The driver 23 can be placed with the fire-resistant light fixture in the ceiling 20. A new construction downlight frame may be used to keep both the light fixture and the driver 23 in the ceiling 20. The frame can have arms for attaching to joists in the ceiling 20 and a circular opening for placing the light fixture.

The driver can also have a color change switch 21. The LEDs 10 can have different colors. One of the colored LEDs can be 3000 Kelvin. One of the colored LEDs can be 5000 Kelvin. One of the colored LED light sources are 3000 and 5000 Kelvin. The colored LED light sources can be selected from the two of: Soft White (2700K-3000K), Bright White/Cool White (3500K-4100K), and Daylight (5000K-6500K).

The above-mentioned light fixtures are fire-resistant and/or fire rated. As used herein, fire-resistant or fire rated means complying with a 2-hour fire rating test, based on at least any one of these standards: UL 263, ASTM E119 and CAN ULC S101.

REFERENCES

1. Fire resistant light fixture
2. Trim portion of housing
3. Outer can
4. Clip
5. Spring of clip
6. Cable
7. Wire cap
8. lens
9. Blank
10. LED
11. LED Board
12. Housing
13. Fire retardant material
14. Inner can
15. Screws for LED board
16. Screws for inner can
17. Spring holder screws
18. Screws for wire cap
19. Anchor portion of clip
20. Ceiling
21. Color Change switch
22. Cable (attached to driver)
23. Driver

What is claimed is:

1. A housing for a light fixture comprising:

a) a circular outer can made from steel;

b) a circular inner can made from a steel;

c) a injectable non-metal, in-organic, non-combustible material in between the outer can and the inner can;

d) a member to directly attach a top of the inner can to a bottom of the outer can;

wherein a source of light is placed inside of the inner can to provide illumination;

wherein the inner can further comprises an outwardly flange portion that touches inside of the outer can;

wherein the material is placed on top of the flange portion of the inner can and above an upper portion of the inner can; and wherein a source of light is placed inside of the inner can to provide illumination.

2. The housing of claim 1, wherein the material is a fiber.

3. The housing of claim 2, wherein the fiber is ceramic fiber.

4. The housing of claim 1, wherein the source of light is configured to be attached to the inner can.

5. The housing of claim 1, wherein the inner can has an opening on a top portion for injection of the material in between the inner can and the outer can.

6. The housing of claim 1, wherein the outer can further comprises an outwardly flange portion.

7. The housing of claim 1, further comprising cable that goes through the inner can, the material, and the outer can to connect the source of light to a source of power.

8. The housing of claim 1, wherein the inner can and the outer can are connected to each other by a fastener.

9. The housing of claim 1, further comprising attaching a housing to the inside of the inner can for placement of the source of light.

10. The housing of claim 9, wherein a board with the source of light is placed inside of the housing, and attached to the itnler can with a fastener.

11. The housing of claim 1, wherein a trim of the housing has a flange portion that is positioned below a flange portion of the outer can.

12. The housing of claim 1, further comprising a clip attached to the outer can for attaching the can to a ceiling.

13. The housing of claim 12, wherein there are two clips and the two clips are made from steel.

14. A housing for a light fixture comprising:

a) an outer can made from steel, the outer can have a top portion, a circular side portion, and a circular flange portion;

b) an inner can made from steel, the outer can have a top portion, a circular side portion, and a circular flange portion, with a tip of the inner can touching inside of the sidewall of the outer can;

c) a non-metal, in-organic, non-combustible material in between the outer can and the inner can, the material placed above the flange portion and the top portion of the inner can;

d) a wire exiting the outer can for carrying power to a source of light;

e) a clip attached to the outer can for attaching the can to a ceiling; and f) a housing with a source of light inside attached to an inside of the inner can.

15. The housing of claim 14, wherein the material is a fiber.

16. The housing of claim 15, wherein the fiber is ceramic fiber.

17. The housing of claim 14, wherein the housing has a flange portion that is positioned below the ceiling and touches the flange portion of the outer can.

* * * * *